United States Patent van Mil

[11] 4,034,440
[45] July 12, 1977

[54] DEVICE FOR TRANSFERRING SLAUGHTERED POULTRY

[75] Inventor: Martinus Petrus Gerardus van Mil, Boxmeer, Netherlands

[73] Assignee: Stork Brabant B. V., Boxmeer, Netherlands

[21] Appl. No.: 611,491

[22] Filed: Sept. 8, 1975

[30] Foreign Application Priority Data

Sept. 10, 1974 Netherlands .................. 7412044

[51] Int. Cl.² .......................................... A22C 21/00
[52] U.S. Cl. ........................................ 17/24; 17/11; 104/96
[58] Field of Search ................... 17/24, 11, 44.1; 104/96, 97, 188; 198/45, 26, 177 R, 177 T, 483, 678, 796, 473

[56] References Cited

U.S. PATENT DOCUMENTS

| 2,551,155 | 5/1951 | Orling | 17/24 |
| 2,750,897 | 6/1956 | Davis | 104/96 |
| 2,940,401 | 6/1960 | Burrows | 104/96 |
| 2,969,750 | 1/1961 | Clark | 104/96 |
| 3,103,694 | 9/1963 | Zebarth et al. | 17/11 |
| 3,213,488 | 10/1965 | Volpe | 17/11 |
| 3,537,127 | 11/1970 | Brugman | 17/11 |

Primary Examiner—Hugh R. Chamblee
Assistant Examiner—Paul J. Hirsch
Attorney, Agent, or Firm—Edmund M. Jaskiewicz

[57] ABSTRACT

A device for transferring slaughtered poultry from a first conveyor track to a second conveyor track with a guide for the suspension shackle disposed along a part of the first conveyor track and a similar guide along a part of the second conveyor track. Between these parts of the conveyor track there is a transfer guide for the legs of the poultry.

8 Claims, 3 Drawing Figures

DEVICE FOR TRANSFERRING SLAUGHTERED POULTRY

BACKGROUND OF THE INVENTION

My invention relates to a device for transferring slaughtered poultry which, hanging by its legs on a shackle, is moved along a first conveyor track to a shackle advancing along a second conveyor track.

In particular cases it is required, for example in connection with the scheme of a poultry processing plant or with the order of succession in which particular treatments should be performed, that poultry, which hanging by its legs is passed through the plant, is transferred from the one conveyor track to another conveyor track. It is evident that for this operation it is required that an operator is continuously active.

SUMMARY OF THE INVENTION

My invention aims to provide a device by means of which the transfer of the poultry from the one conveyor track to the other can be mechanically performed.

According to my invention such a device comprises a guide for the suspension shackle which is disposed along a part of the first conveyor track, while along a part of the second conveyor track such a guide is likewise disposed and between these parts of the conveyor tracks a transfer guide for the legs of the poultry is arranged, the first end of which ends in the vicinity of the first conveyor track such that at that location the poultry can move from the shackle into the transfer guide, while at the second end a stop and ejector controlled by a shackle detector, arranged along the second conveyor track, are mounted, the arrangement being such that when an empty shackle on the second conveyor track passes by the shackle detector arranged there then the ejector presses the poultry from the transfer guide into this shackle. The device may be constructed in such a fashion that the transfer guide extends for a part of its length parallel to and underneath the first conveyor track thus that the legs of the poultry which is being conveyed along the first conveyor track are introduced into the end of the transfer guide. In the proximity of the bridge part between the part of the transfer guide which is parallel to the conveyor track and the part of the transfer guide which is at right angles with the conveyor track the guide for the suspension shackle is provided with a part turned away from the transfer guide. The device may be constructed in such a way that the first end of the transfer guide ends in front of an ejector controlled by a shackle detector arranged along the first conveyor track in such a way that when a shackle passes by this detector the poultry hanging on the shackle is pressed into the transfer guide by the ejector. Each guide consists conveniently of two rod-shaped members located at a short distance from each other, while the distance between the parts of the transfer guide is adjustable.

The device according to my invention can be used in an apparatus in which the first conveyor track is at a higher level than the second conveyor track, while the poultry due to the influence of the force of gravity moves, via the transfer guide, from the first conveyor track to the second conveyor track. The device may, however, also be constructed in such a fashion that driving means for driving the poultry in the longitudinal direction of the transfer guide are arranged along this guide. The stop and the second ejector are preferably coupled to each other and capable of turning about an axis crossing the transfer guide.

The invention provides a simple device which is reliable in service and which can be easily adapted to existing apparatus for mechanically transferring slaughtered poultry from a first conveyor track to a second conveyor track.

SURVEY OF THE DRAWINGS

Figure 1:
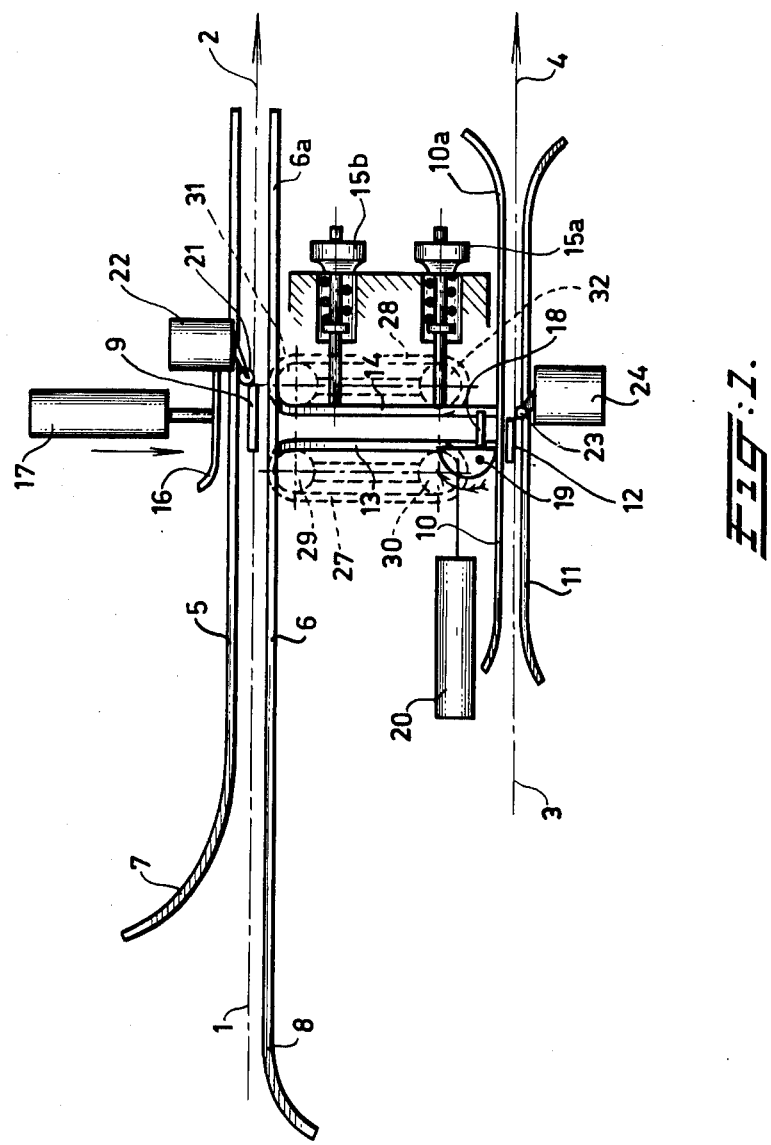
FIG. 1 represents diagrammatically a plan view of a first embodiment of the device according to the invention.

DESCRIPTION OF PREFERRED EMBODIMENTS:

In FIG. 1 a first conveyor track for slaughtered poultry is represented in outline and denoted by 1. Along this conveyor track poultry hanging by its legs on suspension shackles known per se is advanced in the direction of the arrow 2. A dot and dash line denoted by 3 represents diagrammatically a second conveyor track along which the poultry hanging on shackles should be likewise advanced e.g. in the direction of the arrow 4.

The device according to the invention is destined to transfer the poultry from the conveyor track 1 to the conveyor track 3 which e.g. may be necessary in case of a particular lay out and arrangement of a mechanical poultry slaughter house.

Arranged along the conveyor track 1 are two guides 5, 6 extending in the longitudinal direction thereof and each having a bent inlet end 7, 8. They serve for guiding the suspension shackles 9 in such a way that they are prevented from swinging. In a corresponding way the guides 10, 11 for the shackles which move along the conveyor track 3 are arranged along the conveyor track 3, one of these guides being diagrammatically represented and denoted by the reference numeral 12.

Transverse guides 13, 14 are arranged between a pair of guides 5, 6 and a pair of guides 10, 11. Part 14 is supported by the diagrammatically represented adjusting members 15a, 15b so that the distance between guides 13, 14 can be related to the dimensions of the poultry to be processed. This distance is in practice adjusted such that the poultry loosely hanging by the legs between the guides 13, 14 can move from a suspension shackle on the track 1 to a suspension shackle on the track 3. The conveyor track 1 is at a higher level than the conveyor track 3. When the bird has once landed between the guides 13, 14 then it glides further, due to the force of gravity, along these guides.

Figure 2:
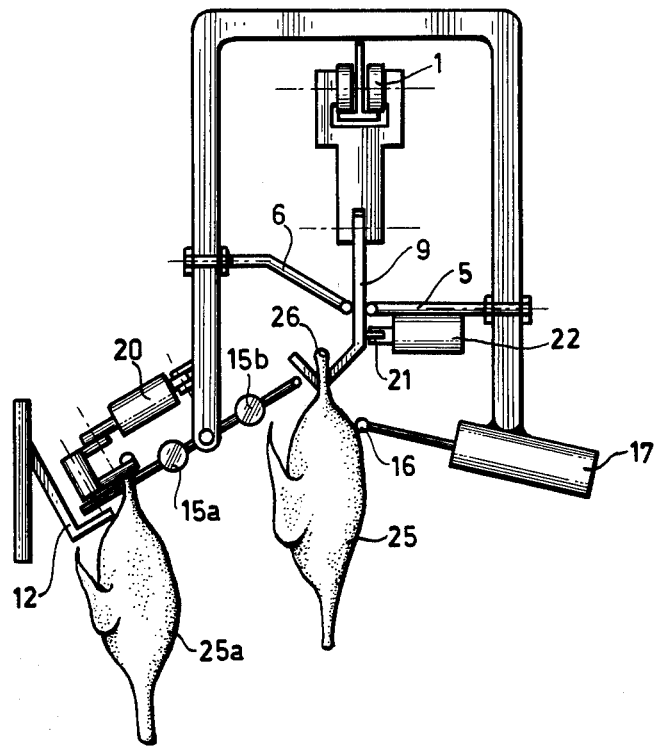
FIG. 2 represents diagrammatically a cross section through this device.

As is apparent from FIG. 2 the ends of the guides 13, 14, which are turned to the conveyor track 1 end under the guides 5, 6 at the level of the suspension shackle 9. FIG. 2 shows likewise the shackle 12 hanging on the conveyor track 3 and the other end of the guides 13, 14, which ends at the level of the suspension point of the poultry in such a shackle 12.

In the proximity of the end of the guides 13, 14, which is turned to the guides 5, 6, is the ejector 16, driven by the driving cylinder 17, and in the proximity of the other end is the stop 18 with the ejector 19, driven by the driving cylinder 20. The stop 18 and the ejector 19 are interconnected and the whole can turn about an axis crossing the guides 10, 11. In the proximity of the conveyor track 1 is a feeler 21 which is coupled to a device 22 for producing a control signal for the driving cylinder 20.

The effect is as follows:

When shackle 9, from which bird 25 is suspended by its legs, arrives at feeler 21 then device 22 emits a control signal for the driving cylinder 17. The latter presses the ejector 16 to the mouth of guides 13, 14, whereby bird 25 is pressed from the shackle 9 and lands by its legs between guides 13, 14. The bird glides then further into the position denoted by the reference numeral 25a and comes to bear against the stop 18. When an empty shackle moving along the conveyor track 3 passes by feeler 23 then device 24 emits a control signal for the driving cylinder 20, whereby the stop 18 turns to the right and out of the way, the ejector 19 is engaged behind the legs of the bird and presses same into the shackle 12. In this fashion the bird is transferred from one conveyor track to the other.

In the aforementioned embodiment the poultry moves along the transfer guides 13, 14 owing to the force of gravity and to that end the conveyor track 1 should be located at a higher level than the conveyor track 3. It is, however, also possible to mount conveyor belts like denoted by 27 and 28 along these guides 13, 14, which are slung over the rollers 29 to 32 and driven at a suitable speed. In that case the device is also suitable to transfer poultry from a conveyor track 1 to a conveyor track 3 situated at the same or at a higher level.

Figure 3:
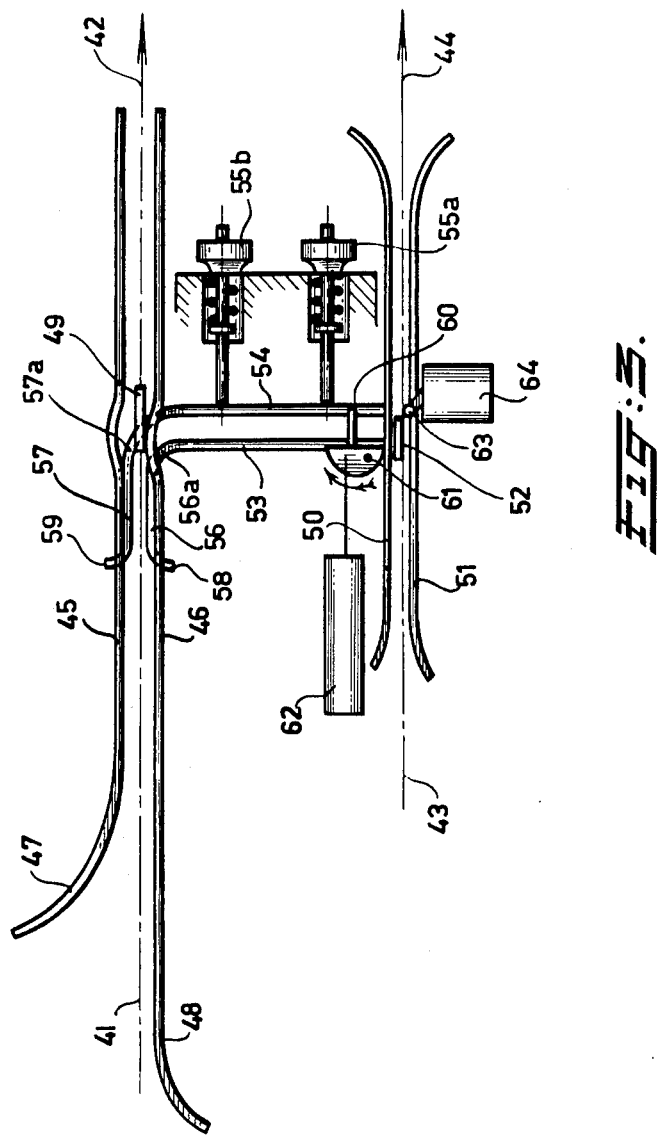
FIG. 3 represents diagrammatically a plan view of a second embodiment of the device according to the invention.

FIG. 3 shows a plan view of an embodiment which has much similarity to the embodiment according to FIG. 1. The poultry is not moved into the transfer guide by an ejector but automatically introduced thereinto.

In FIG. 3 the first conveyor track along which the poultry hanging by its legs on the shackles is advanced in the direction of arrow 42, is diagrammatically represented by the dot and dash line 41. A second conveyor track, along which the poultry, likewise hanging on shackles, is advanced in the direction of arrow 44, is denoted by 43. The poultry should therefore be transferred from conveyor track 41 to conveyor track 43.

In this embodiment, too, two guides extending in a longitudinal direction along the conveyor track are denoted by the reference numerals 45, 46 and each provided with a bent inlet end 47, 48, respectively. The diagrammatically represented suspension shackles 49 are guided by these guides in such a fashion that they are prevented from swinging. Guides for the suspension shackles are also provided along the conveyor track 43. These guides are denoted by 50 and 51 and a suspension shackle moving along this conveyor track is denoted by 52.

Between pairs 45, 46 and 50, 51 are arranged the transfer guides 53, 54. Guide 54 is supported by the adjusting members 55a, 55b, so that the distance between the guides can be adjusted at will. The conveyor track 41 may be at a higher level than the conveyor track 43, so that the poultry due to its individual weight moves between the guides 53, 54. It is also possible to mount a pair of conveyor belts like indicated in FIG. 1 along these guides. These are, however, not represented in the figure.

Each of the guides 53, 54, respectively, has an inlet part 56, 57 respectively with outwardly bent ends 58, 59, respectively; these parts are located under the guides 46, 45, respectively and are for a part of their length parallel thereto. Due to this shape the leg of the bird is urged to move between the guide parts 56, 57 and in the bent bridge part 56a, 57a the legs are pressed from the shackle. The bird moves then with its legs fitting between the guides 53, 54 to the other end thereof.

In the proximity of the other end of the guides 53, 54 are the stop 60 and the ejector 61 driven by the driving cylinder 62. The stop 60 and the ejector 61 are interconnected and the whole can turn about an axis crossing guides 50, 51. A feeler 63 is disposed in the vicinity of conveyor track 43, which is coupled to a device 64 for emitting a control signal for driving cylinder 62.

When a bird hanging on a shackle reaches the inlet end 58, 59 of the guide parts 56, 57 then, as has been described before, in the bridge part 56a, 57a between the guide parts 56, 57 on the one hand and the guides 53, 54 on the other hand the legs of the bird are urged from the shackle and the bird moves then, hanging its legs between the guides 53, 54, towards stop 60.

When an empty shackle moving along the conveyor track 43 passes feeler 63, device 64 emits a control signal for the driving cylinder 62 whereby the stop 60 turns to the right, the ejector 61 is engaged behind the legs of the bird to press same into the shackle 52. So the bird is transferred from the one conveyor track to the other.

What I claim is:

1. A device for transferring slaughtered poultry hanging by its legs on a shackle moving along one conveyor to a shackle advancing along another conveyor, comprising a first conveyor track having a plurality of first shackles moving therealong with slaughtered poultry suspended by their legs from said first shackles, first means along a portion of said first conveyor track for guiding said first shackles therealong, a second conveyor track having a plurality of second shackles moving therealong, second means along a portion of said second conveyor track for guiding said second shackles therealong, a transfer guide between said first and second guide means to receive the legs of slaughtered poultry, said transfer guide having a first end adjacent said first conveyor track such that the legs of poultry can be moved from a first shackle to said transfer guide, said transfer guide having a second end adjacent said second conveyor track, means for detecting the presence of a second shackle on said conveyor track in the vicinity of said transfer guide second end, and means at said transfer guide second end responsive to said detecting means for stopping the legs of poultry moving thereon and means for ejecting poultry from said transfer guide to a second shackle on said second conveyor track such that poultry is released from said stop means and pressed by said ejecting means from said transfer guide to a second shackle on said second conveyor track.

2. Device according to claim 1, wherein the transfer guide extends for part of its length parallel to and underneath the first conveyor track in such a way that the legs of the poultry which is being conveyed along the first conveyor track are introduced into the end of the transfer guide.

3. Device according to claim 2, wherein said first guide means has a part turned away from the transfer guide in the proximity of a bridge part between the part of the transfer guide which is parallel to the conveyor track and the part of the transfer guide which is at right angles with the conveyor track.

4. Device according to claim 1 wherein the first end of the transfer guide ends in front of a second ejector controlled by a shackle detector arranged along the first conveyor track such that when a shackle passes by this detector the poultry hanging on the shackle is pressed into the transfer guide by the ejector.

5. Device according to claim 1 wherein said first and second guide means each comprise two rod-shaped members spaced a short distance from each other, and means for adjusting the distance between the parts of said transfer guide.

6. Device according to claim 1 wherein the first conveyor track is at a higher level than the second conveyor track, such that the poultry due to the influence of the force of gravity moves, via the transfer guide, from the first conveyor track to the second conveyor track.

7. Device according to claim 1 comprising driving means for driving the poultry in the longitudinal direction of the transfer guide.

8. Device according to claim 1 wherein the stop means and the ejector means are coupled to each other and capable of turning about an axis crossing the transfer guide.

* * * * *